United States Patent [19]
Dove

[11] Patent Number: 5,658,060
[45] Date of Patent: Aug. 19, 1997

[54] ARRANGEMENT FOR PROJECTION DISPLAYS EMPLOYING REFLECTIVE LIGHT VALVES

[75] Inventor: Derek Brian Dove, Mt. Kisco, N.Y.

[73] Assignee: International Business Machines Corporation, Armonk, N.Y.

[21] Appl. No.: 698,297

[22] Filed: Aug. 15, 1996

Related U.S. Application Data

[63] Continuation of Ser. No. 370,942, Jan. 10, 1995, abandoned.

[51] Int. Cl.[6] ................................................ G03B 21/14
[52] U.S. Cl. ................................. 353/33; 353/20; 353/31
[58] Field of Search ............................... 353/31, 33, 34, 353/37, 81, 94, 20; 359/40, 48, 49

[56] References Cited

U.S. PATENT DOCUMENTS

| | | |
|---|---|---|
| 3,202,039 | 8/1965 | De Lang et al. . |
| 3,602,637 | 8/1971 | Katsuta et al. . |
| 4,097,128 | 6/1978 | Matsumoto et al. . |
| 4,687,301 | 8/1987 | Ledebuhr ........................... 353/31 |
| 4,916,529 | 4/1990 | Yamamoto et al. . |
| 4,969,730 | 11/1990 | van den Brandt ................... 353/31 |
| 5,022,750 | 6/1991 | Flasck ............................... 353/31 |
| 5,096,280 | 3/1992 | Hamada ............................ 359/634 |
| 5,108,172 | 4/1992 | Flasck ............................... 353/37 |
| 5,196,926 | 3/1993 | Lee ................................... 353/122 |
| 5,206,674 | 4/1993 | Puech et al. ....................... 353/122 |
| 5,251,068 | 10/1993 | Oshima et al. .................... 359/634 |
| 5,270,804 | 12/1993 | Lach ................................. 353/33 |
| 5,309,188 | 5/1994 | Burstyn ............................ 353/33 |
| 5,374,968 | 12/1994 | Haven et al. ...................... 353/31 |

FOREIGN PATENT DOCUMENTS

| | | |
|---|---|---|
| 0295137A1 | 12/1988 | European Pat. Off. . |
| 0303898A1 | 2/1989 | European Pat. Off. . |
| 0509194A1 | 10/1992 | European Pat. Off. . |
| 61-177079 | 8/1986 | Japan . |
| 0497146 | 3/1992 | Japan ............................... 353/33 |

*Primary Examiner*—William Dowling
*Attorney, Agent, or Firm*—Scully, Scott, Murphy & Presser

[57] ABSTRACT

Optical arrangements for a high definition projection display using reflective light valves. Separate polarizing means are placed in proximity to respective separate reflective light valves tuned to the color to be modulated. A combining prism assembly combines the light reflected from each valve and directs the light onto a projection display.

14 Claims, 3 Drawing Sheets

1

ARRANGEMENT FOR PROJECTION DISPLAYS EMPLOYING REFLECTIVE LIGHT VALVES

This is a continuation of application Ser. No. 08/370,942 filed on Jan. 10, 1995, and now abandoned.

BACKGROUND OF THE INVENTION

1. Field of the Invention

The present invention is directed to optical systems for the realization of a full color projection display employing reflective light valves.

2. Discussion of the Prior Art

There is interest in very high resolution displays for work stations, multimedia, medical and other applications. In particular, projection displays using spacial light modulators or reflective light valves, for example, of liquid crystal type, have the potential for producing a display of resolution performance beyond that available from CRT's.

U.S. Pat. No. 5,270,804 discloses a color display system utilizing reflective light valves wherein light is first split into its two axes of polarization by a beam splitting cube. Light in one of the polarizations is directed to a color splitting-recombining prism assembly where each color is separated, reflected from a light valve, recombined and redirected through the polarizing beam splitter. U.S. Pat. No. 4,687,301 is directed to a full color projector utilizing a liquid filled three color separating-recombining prism assembly. A glass three color prism assembly is disclosed in U.S. Pat. No. 4,687,301.

In a system using reflective light valves, the illuminating light beam and the reflected imaging beam must share a portion of the light path through the optical assembly, introducing considerable complexity and unwanted light scattering. Thus, there is a need for an arrangement aimed at minimizing the common light path for improved contrast control and simplification of optical component design.

SUMMARY OF THE INVENTION

The present invention is directed to an apparatus for projecting a plurality of colors of light, which includes a separate polarizing beam splitter disposed adjacent to a reflective light valve for each color. The apparatus includes color separating means that directs light of each individual color into the designated polarizer. The light reflected from each light valve makes a second pass through each polarizing beam splitter and is recombined in a color combining means, which thereafter directs the combined light beam onto a projection lens. The key feature of the present invention is that each light valve has its own beam splitter prism or mirror tuned to the color to be modulated by the light valve, which provides improved contrast and color in the displayed image.

DETAILED DESCRIPTION OF THE INVENTION

The liquid crystal light valves referred to herein operates under the principle that polarized light incident upon the cells of the valve is rotated upon reflection by an amount depending on the voltage applied across the liquid crystal. The modulated beam is polarized at 90 degrees to the incident linearly polarized beam. To use such a cell as a modulator of light, it is necessary to apply light polarized along a particular direction, but then to reject this light in favor of light rotated in polarization in the reflected beam. The light valve consists of an array of a large number of small light controlling pixels. In the reflective light valve projection system of the present invention, the incident and reflected beams must be separated and the polarization of the beams must also be separated. This may be achieved, as is well known, by use of a polarizing beam splitter.

Figure 1:
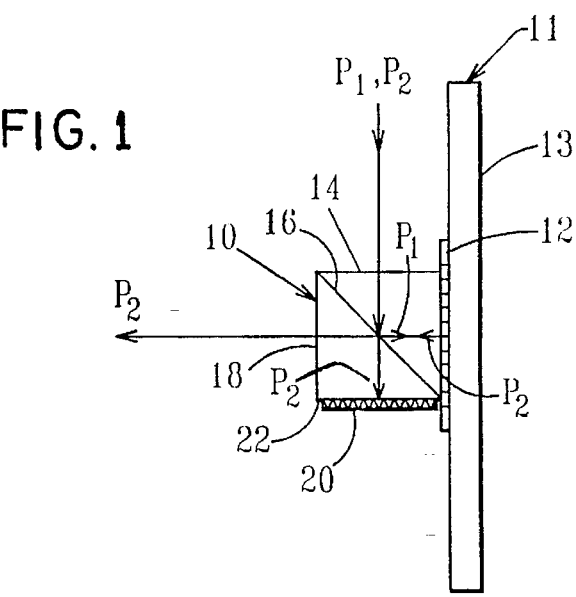
FIG. 1 is a schematic of a subassembly of the present invention showing a single polarizing beam splitting prism attached to a reflective light valve.

In the projection display apparatus of the present invention, each reflective light valve has associated therewith a separate polarizing beam splitter. FIG. 1 shows, in side view, a polarizing beam splitter 10 attached to a reflective liquid crystal light valve assembly 11 comprising a light valve 12 and a supporting plate 13. Rays from the illumination system in a particular color enter the prism 10 at an upper surface 14. Light of polarizations $P_1$, $P_2$ parallel and perpendicular to the plane of the surface 16 extending diagonally across the prism 10 typically are transmitted ($P_2$) or are reflected ($P_1$) by the surface 16. The reflected ray $P_1$ of unchanged polarization is reflected a second time whereas light of rotated polarization $P_2$ exits the prism normal to the surface 18 of the light valve. A light absorbing layer 20, typically black, is positioned on a bottom surface 22 of prism 10. Layer 20 absorbs light of polarization $P_2$ initially transmitted through surface 16. Layer 20 also absorbs light of polarization $P_1$ that is reflected unchanged from light valve 12.

In a different type of light valve, modulation of the beam may be achieved by other means, for example, by a light scattering effect within the liquid crystalline layer or by an array of micro deflectable mirrors. In these cases, the present arrangements apply but with relaxation of the polarization conditions. The light valve of liquid crystal type may be addressed by a matrix of transistors each one controlling a micro modulating cell or the cell may be continuous or may undergo a local thermal phase change that introduces light scattering. The phase change may be induced by a highly focused writing beam. FIG. 1 illustrates the basic light valve polarizing prism assembly for a single color. For full color, the images from three such cells, one for each color, must be brought into coincidence upon a screen with low distortion, precise overlay and good color consistency across the screen. For these reasons, it is desirable to form the screen image with a single projection lens.

Figure 2:
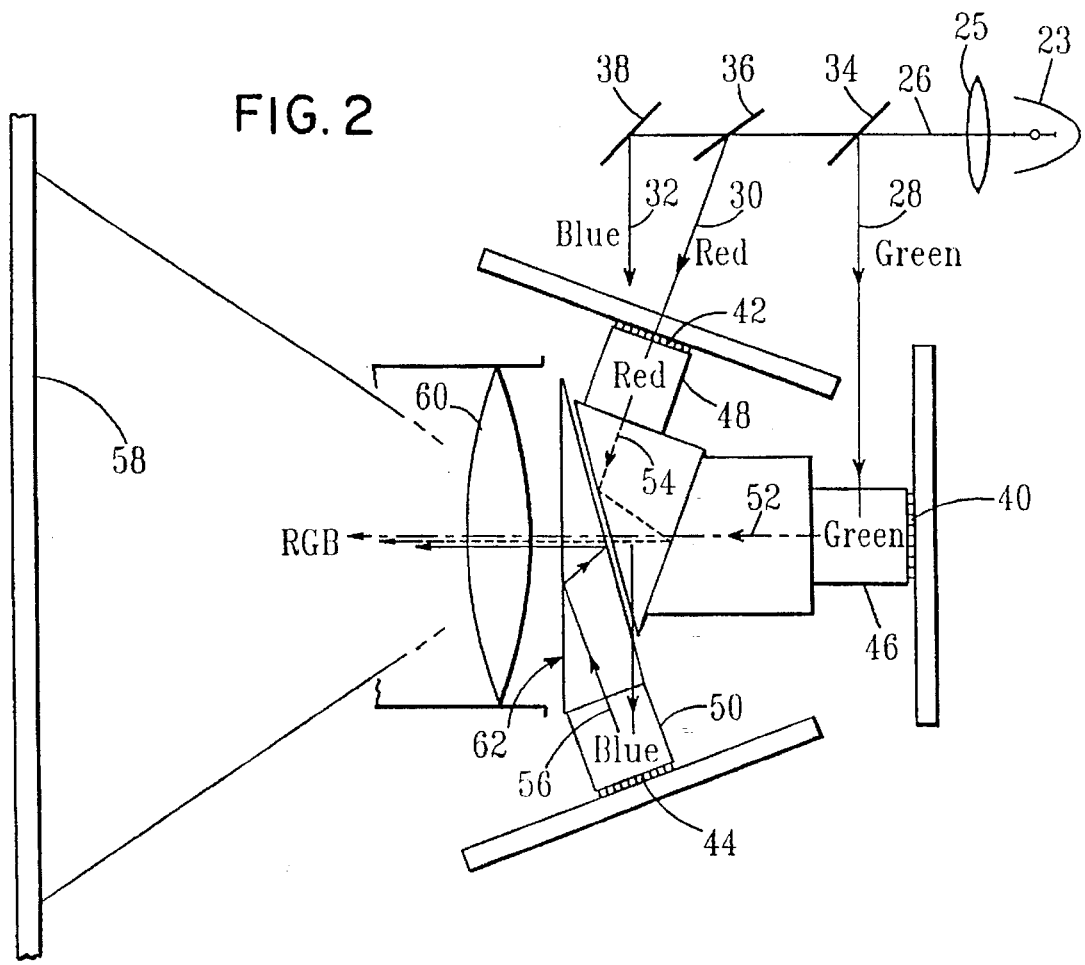
FIG. 2 is a plan view of one embodiment of a projection display apparatus of the present invention, using a three color prism.

An optical arrangement for imaging three light valves onto a screen using a single projection lens is shown in FIG. 2. In this embodiment, a light source 23 generates an illumination beam 26 formed by lens assembly 25. The illumination beam 26 is separated into three paths, 28, 30, 32, one for each color by three dichroic mirrors 34, 36, 38.

Each light valve 40, 42, 44 has its own polarizing beam splitter prism 46, 48, 50 or mirror tuned to the color to be modulated by the light valve, typically red, green or blue. The polarizing beam splitters are closely associated with or attached to the light valves. The beams 52, 54, 56 reflected by the three light valves are modulated by polarization rotation and carry the information to be imaged onto a screen 58. It is important that the beam splitters provide a high level of reflection for one polarization and a high level of transmission for the 90 degree rotated polarization of the modulated beam. In order to use one projection lens 60, the reflected beams are combined to a common light path by a prism assembly 62, such as the three prism assembly shown in FIG. 2. The prism assembly 62 is similar to that employed for color separation in, for example, color video cameras.

Figure 3:
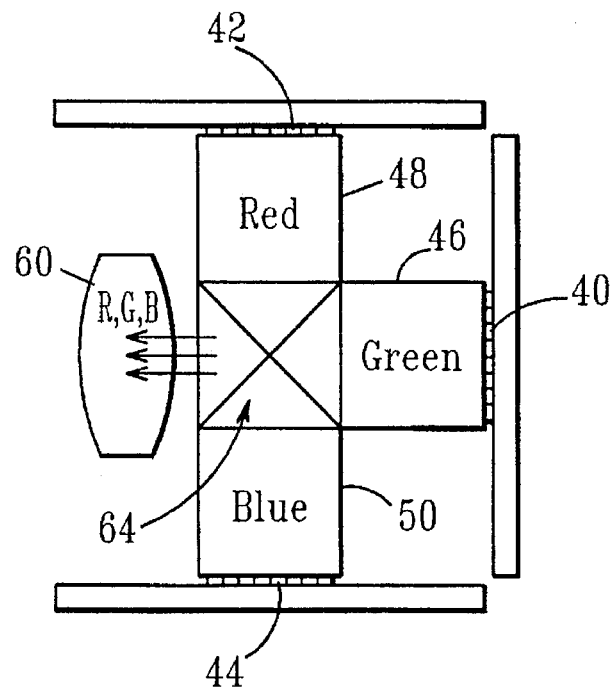
FIG. 3 is a plan view of another embodiment of the projection display apparatus of the present invention, using a dichroic cross combining cube.

Other prism configurations for recombining the reflected beams may be used. As shown in FIG. 3, a color dichroic cube 64 such as a cross prism may be substituted for the three prism assembly of FIG. 2.

Figure 4:
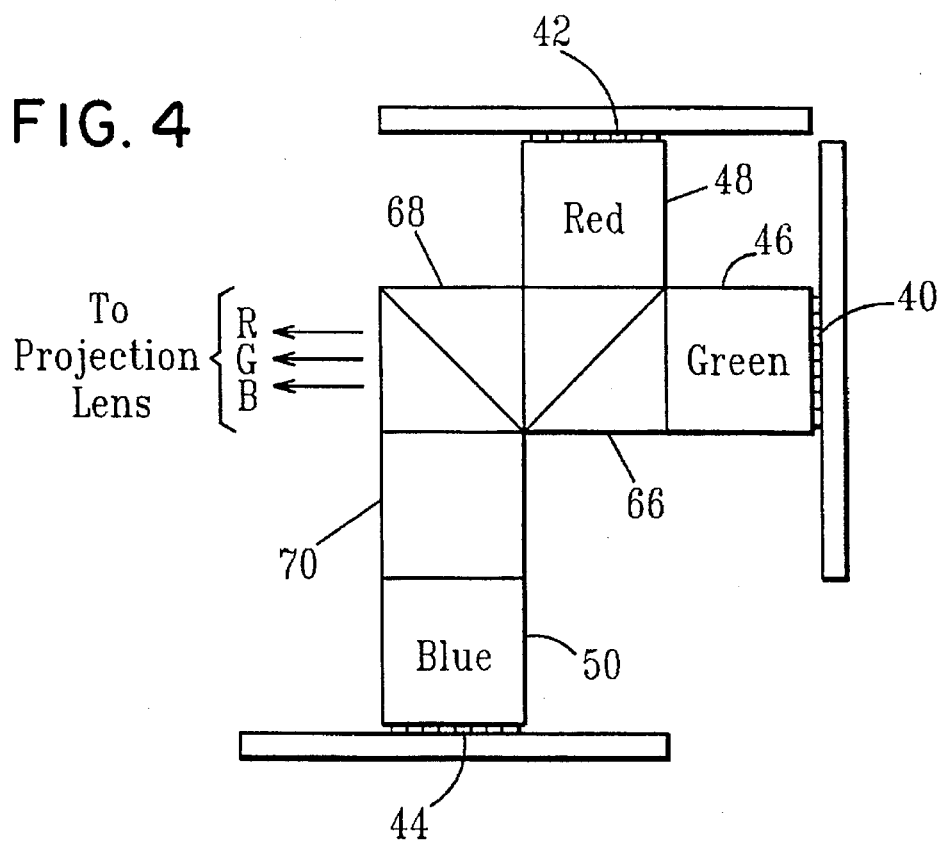
FIG. 4 is a plan view of another embodiment of the projection display apparatus of the present invention, using separate dichroic prisms for image combination.

At the cost of additional path length, the color combining prism assembly may be provided by separate color reflecting prisms 66, 68 and spacer prism 70, as shown in FIG. 4. For example, prism 66 will reflect red and transmit green light reflected from valves 40 and 42. Prism 68 reflects blue light from valve 44.

Spacer 70 is needed so that each color will pass through the same number of prisms.

As noted above, for each embodiment, the illumination is split into three colors, e.g., red, green and blue, by dichroic mirrors or other means prior to illuminating the three cells. For efficient polarization separation, it is necessary that the beams have an angular divergence of only a few degrees. The result of this is that the projection lens has to be of the so-called telecentric type, typically a lens of a more complex type.

Figure 5:
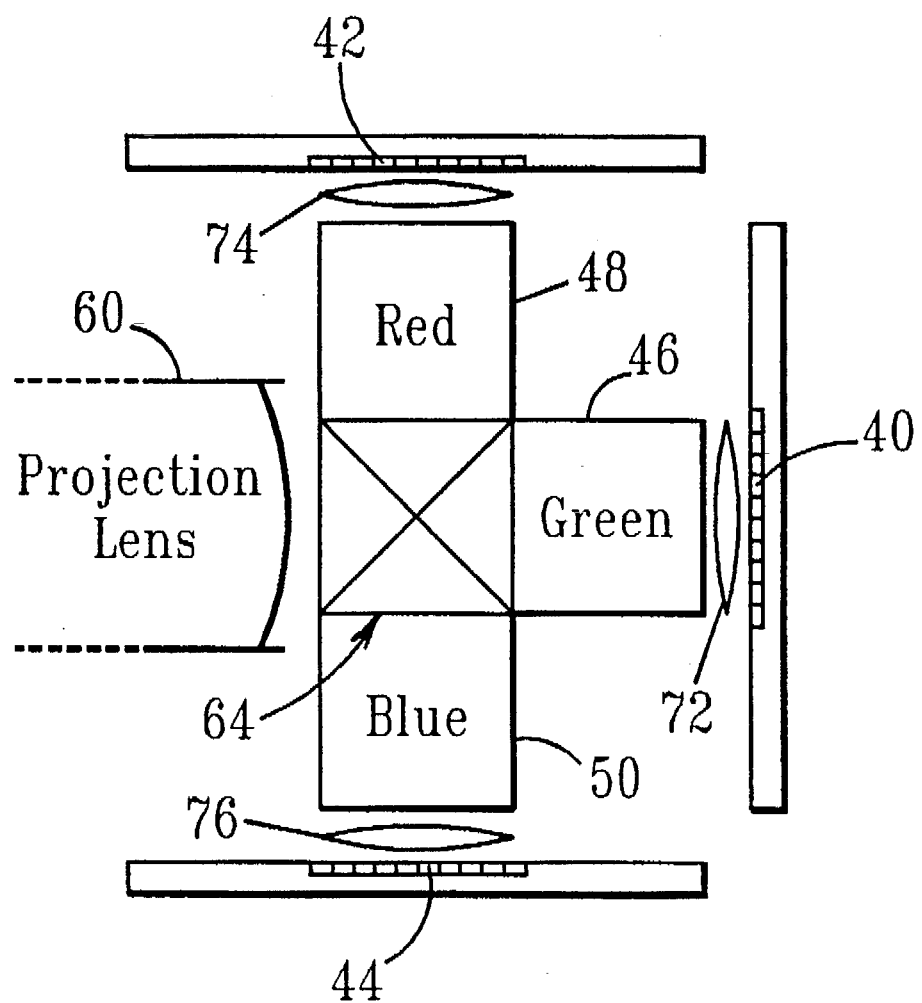
FIG. 5 is a plan view of a further embodiment of the projection display apparatus of the present invention, using a field lens for each light valve.

In a further embodiment, in all of the above arrangements, correcting lenses 72, 74, 76 may be placed close to the light valves so as to direct the reflected beams through the center of the projector lens so that the lens no longer has to be a telecentric lens, as shown in FIG. 5 for the dichroic cross case. Such field lenses permit adjustment for differences between the imaging properties of the main projector due to the need to image with precise overlap the R G and B light valves.

While the invention has been particularly shown and described with respect to preferred embodiments thereof, it will be understood by those skilled in the art that the foregoing and other changes in form and details may be made therein without departing from the spirit and scope of the invention.

Having thus described the invention, what is claimed as new and desired to be secured by Letters Patent is:

1. An apparatus for projecting a plurality of colors of light comprising:

a plurality of sources for each of said plurality of colors of light;

a plurality of spacial light modulators each corresponding to one of said colors of light;

a plurality of polarization means for directing each of said plurality of colors of light in a predetermined polarization onto each corresponding spacial light modulator at an angle which is perpendicular to said spacial light modulator, each of said polarization means being located directly against each corresponding spacial light modulator; and a means for combining said plurality of colors of light reflected from said spacial light modulators into a combined beam, said polarization means being located between said combining means and said spacial light modulators.

2. The apparatus of claim 1 wherein said plurality of sources of colors of light include a source of blue light, a source of red light, and a source of green light, said plurality of spacial light modulators includes a first spacial light modulator, a second spacial light modulator, and a third spacial light modulator, said plurality of directing means includes a first means for directing said red light in a predetermined polarization onto said first spacial light modulator, a second means for directing said blue light in a predetermined polarization onto said second spacial light modulator; and a third means for directing said green light in a predetermined polarization onto said third spacial light modulator, and wherein said combining means includes means for combining said red light reflected from said first spacial light modulator, said blue light reflected from said second spacial light modulator and said green light reflected from said third spacial light modulator into said combined beam.

3. The apparatus of claim 1, further including a means for projecting said combined beam onto a screen.

4. The apparatus of claim 1, wherein said apparatus is an apparatus for projecting a color image onto a screen.

5. The apparatus of claim 1, wherein said plurality of means for directing each of said plurality of colors of light in a predetermined polarization includes a plurality of polarizing beam splitting prisms.

6. The apparatus of claim 1, wherein said means for combining said plurality of colors includes a color combining prism assembly having a plurality of input faces for receiving reflected light of each of said plurality of colors in a corresponding input face.

7. The apparatus of claim 1, wherein each of said plurality of means for directing each of said plurality of colors of light in a predetermined polarization are in close proximity to each of said corresponding spacial light modulators.

8. The apparatus of claim 3, wherein said combining means is positioned between said projection means and said plurality of polarization means so that light traverses said combining means in one direction only.

9. The apparatus of claim 6, wherein said color combining prism assembly is comprised of three solid glass prisms arranged to form two internal reflecting surfaces for combining three colors of light.

10. The apparatus of claim 1, wherein said means for combining said plurality of colors includes a dichroic cross prism assembly for combining three color components received in three separate input faces and outputting the combined beam through an output face.

11. The apparatus of claim 1, wherein said means for combining said plurality of colors includes a plurality of dichroic mirror prisms.

12. The apparatus of claim 11, wherein said plurality of dichroic mirror prisms includes one of said prisms for reflecting a first color and one of said prism for reflecting a second color and transmitting a third color.

13. The apparatus of claim 1, further including a plurality of field lenses each positioned between said spacial light modulators and said polarization means.

14. The apparatus of claim 1, wherein each of said plurality of means for directing each of said plurality of colors of light in a predetermined polarization are attached to each of said corresponding spacial light modulators.

* * * * *